Feb. 7, 1950 R. P. BECHLE 2,496,977
DIFFERENTIAL REWIND CONTROL
Filed Jan. 10, 1947
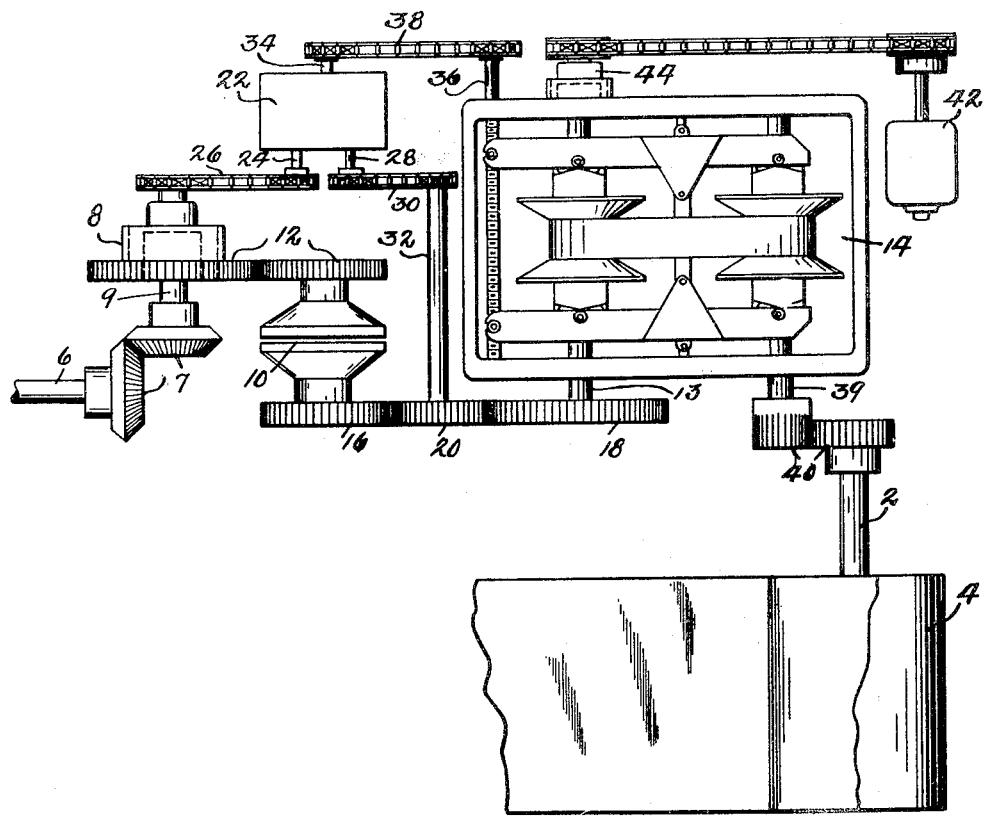
INVENTOR.
Rudolph P. Bechle
BY James G. Bennett
ATTORNEY Patented Feb. 7, 1950

2,496,977

UNITED STATES PATENT OFFICE 2,496,977

DIFFERENTIAL REWIND CONTROL

Rudolph P. Bechle, Yonkers, N. Y., assignor to Potdevin Machine Company, Brooklyn, N. Y., a corporation of New York Application January 10, 1947, Serial No. 721,202

7 Claims. (Cl. 242—75)

My invention is directed to differential rewind controls and has for a primary object to provide rewind drive mechanism which will permit the winding of large rolls on small cores and automatically provide for velocity control of the rewind shaft to compensate for increasing roll diameter as the roll is wound.

Many different forms of mechanism have been used for this purpose prior to my invention, including simple slip belts and slip clutches. However, these have been objectionable due to the very considerable slippage required and because of the very great variations in web tensions encountered with this type of mechanism.

Other rewind drives have been constructed employing variable speed drive devices controlled by dancing or bob rollers. These are objectionable, however, because it is ordinarily necessary to contact the wet printed side of the web with a guide roller to provide the necessary loop. They are further objectionable in that hunting usually takes place in these mechanisms.

My invention employs both a slip clutch and a variable speed device. However, in my arrangement the slip clutch is on the input side of the variable speed device and is so arranged that conditions of slippage and speed are held substantially constant through the full range of diameters from core size to full roll size.

My invention further provides mechanism employing a differential, two shafts of which are geared to the input and output shafts of the slip clutch respectively. The gearing is so arranged as to provide the same period of rotation on the two mentioned differential shafts when a definite predetermined slippage takes place in the clutch. The third shaft of the differential is geared into the adjusting mechanism of the variable speed drive. Thus any departure from the predetermined slippage at the clutch will result in corrective rotation being applied to the control of the variable speed device immediately to re-establish the proper slippage.

The accompanying drawing shows an embodiment of my invention in diagrammatic form, for the sake of clarity and simplicity.

Referring to the drawing in detail, 2 designates the rewind shaft and 4 the rewind roll. As above set out, the primary object of my invention is to provide drive mechanism for the shaft 2 which is so arranged as to permit the winding of large rolls on small cores and automatically to provide for velocity control of the rewind shaft 2, to compensate for increasing diameter of the rewind roll 4.

6 designates the main drive shaft of my mechanism. This shaft is geared to the web processing machine in such manner that its rotative speed is directly proportional to the linear speed of the web. The shaft 6 is geared through gears 7 and shaft 9 to an over-running clutch 8.

10 designates a slip clutch of conventional construction, the pressure of which is adjusted initially to establish the tension which is to be maintained on the web being rewound.

The input side of the slip clutch 10 is geared to the output side of over-running clutch 8 through gears 12, while the output side of clutch 10 is geared to the input shaft 13 of a variable speed device 14, such as the conventional Reeves drive for example, through gears 16 and 18 and intermediate gear 20.

22 designates a differential of conventional construction, such as shown, for example, in co-pending application, Serial No. 767,378, filed August 8, 1947. One shaft 24 of this differential is geared to the input side of the over-running clutch 8 through chain and sprocket drive 26. Another shaft 28 of the differential 22 is geared to the output side of slip clutch 10 and to the input side of variable speed drive 14 through chain and sprocket drive 30, shaft 32 and gears 16, 20, and 18.

The third shaft 34 of the differential 22 is geared to the adjusting shaft 36 of the variable speed device 14 through chain and sprocket drive 38.

The output shaft 39 of the variable speed device 14 is geared through gears 40 to the shaft 2 of the rewind roll 4.

As above pointed out, the shaft 6 revolves at a speed proportional to the web speed, and thus the length of paper or other web material delivered to the rewind roll is constant, assuming constant speed of the shaft 6.

However, the length of web required by the shaft 2 per revolution is not constant, but a gradually increasing amount; the length required per revolution being directly proportional to the diameter of the rewind roll. As the roll size increases constantly during operation, the ratio of the speed of the rewind shaft 2 to the speed of the drive shaft 6 must become progressively smaller. If this change of ratio is not precisely controlled, the web will either break or build up a loop.

With my mechanism the slip clutch 10 becomes a controlling element. This clutch has a constant torque characteristic provided slippage is held constant. Since input clutch speed is constant and slippage substantially constant, output clutch speed is constant. Inasmuch as the output torque of clutch 10 is constant, and speed substantially constant, it follows that the output clutch horsepower is constant, and except for losses is all absorbed in winding the web on the rewind roll. The power exerted on the web being rewound is proportional to the product of linear web speed and web tension. Since linear web speed is constant and horsepower constant, the web tension is constant.

As stated the web tension is substantially constant. The deviation is due to the fact that the variable speed device has an efficiency characteristic that varies slightly over its speed range.

The characteristic of the variable speed transmission neglecting losses, is that for a given input torque and speed the output torque and speed will be inversely proportional to each other. This is simply another form of statement that input and output horsepower are equal.

Assuming that the machine is to be set in operation, the rewind roll core being empty: The pressure of the slip clutch 10 is adjusted to the tension desired on the web to be rewound and the machine started in operation. At this moment, by reason of the slippage in the clutch 10, the differential shafts 24 and 28 are rotating at the same speed, so that the third shaft 34 of the differential is stationary and, consequently, there is no variation in the setting of the variable speed device 14. The slip clutch 10 is essentially a constant torque device and, so long as a constant slippage is maintained in this clutch, the tension on the web being rewound will remain constant. This constant slippage in the clutch 10 is obtained through the medium of the differential 22, inasmuch as, so soon as the slippage of the clutch is varied, the two shafts 24 and 28 of the differential no longer rotate at the same speed. This variation in the relative speeds of the shafts 24 and 28 will, of course, cause the third shafts 34 of the differential to rotate in a direction which depends upon which of the shafts 24 and 28 is rotating at the higher speed, this rotation of the differential shaft 34 effecting rotation of the adjusting shaft 36 of the variable speed device 14 to alter the setting of the variable speed device, thereby to re-establish immediately the proper slippage in clutch 10, so that substantially constant tension is maintained on the web being rewound.

When the rewind roll has reached maximum size, the web is cut and the roll removed.

After the web has been rewound and the press stopped, the variable speed device 14 will be in its minimum speed position. It becomes necessary therefore, to reset this device to maximum speed position before starting again on the next core.

With most variable speed drives above mentioned, the speed ratio can be changed only while the drive is running.

In my drive I may employ an auxiliary resetting motor 42, geared to the input shaft 13 of the variable speed device 14 through a chain and sprocket drive and overrunning clutch 44. The direction of rotation of the drive and other parts is the same as normal rotation when winding a roll.

With shaft 13 being driven by motor 42, the gears 18, 20 and 16 are driven, and through slip clutch 10, the gears 12 are also driven. However, the drive will end at gears 12 because of the overrunning clutch 8 and gears 7, and the shafts 6 and 9 will remain stationary.

It will be seen also that the shaft 28 of the differential 22 will rotate but the shaft 24 will not. Consequently shaft 34 of the differential will revolve and reset the variable speed device 14 to maximum speed position. If desired this resetting of the variable speed device 14 may be made more automatic by employing a limit switch to stop the motor 42 when maximum speed setting of device 14 has been reached.

It will be understood that when the adjusting shaft 36 of the variable speed device 14 is turned in one direction the speed of shaft 39 will be increased with respect to the shaft 13; and that when shaft 36 is turned in the opposite direction the speed of shaft 39 will be decreased with respect to the shaft 13. It will be understood also that shafts 24 and 28 rotate in the same direction both in normal running and re-setting. The direction of rotation of the shaft 34 of the differential depends upon whether the shaft 24 or the shaft 28 is revolving faster. The gearing of the differential is such that when 28 operates slower than shaft 24, shaft 34 will revolve in the proper direction to slow the relative speed of the shaft 39 of the variable speed device 14. This is normal operation when winding a roll of increasing diameter. When re-setting, however, shaft 24 is stationary, as above explained, so that shaft 34 will turn in the proper direction to speed up the shaft 39.

It will be appreciated from all of the foregoing that I have provided a differential rewind control whereby a web may be rewound upon a rewind roll under substantially constant tension, despite the constant increase in the diameter of the rewind roll.

It will be seen also that my control essentially comprises a slip clutch, the slippage of which automatically is held substantially constant through the medium of the differential 22.

It will be appreciated also that intermediate the slip clutch and the rewind roll I provide a variable speed device, the output torque of which is varied automatically and directly as the diameter of the rewind roll.

As a consequence of this mechanism, therefore, I obtain a substantially constant tension on the web being rewound, despite the gradually increasing diameter of the rewind roll.

It will be seen also that I provide for resetting the variable speed device after a roll has been rewound to desired maximum diameter, so as to begin the rewinding of the next roll.

What I claim is:

1. Rewind mechanism comprising in combination a drive shaft, an over-running clutch, a slip clutch and a variable speed device; a differential for varying the setting of the variable speed device; the input side of the slip clutch being connected to the output side of the over-running clutch; a shaft for the differential connected to the input side of the over-running clutch; another shaft for the differential rotatably connected intermediate the output side of the slip clutch and the input of the variable speed device, and a third shaft for the differential for varying the setting of the variable speed device.

2. Rewind mechanism comprising in combination a drive shaft, a rewind roll, and a driving connection between the drive shaft and rewind roll, said connection comprising a slip clutch, a correcting differential having a shaft connected to the input of said clutch, a variable speed device, another shaft for said differential connected to the output of the said clutch and to the input of said variable speed device, an output shaft for the variable speed device connected to the rewind roll, and a third shaft for the differential operable upon a variation in the clutch slippage for varying the setting of the said variable speed device as the diameter of the rewind roll increases, to restore the clutch slippage to the initial setting.

3. Rewind mechanism comprising in combination a rewind roll, a drive shaft, a slip clutch, a differential one shaft of which is connected to the input side of the slip clutch, a variable speed device having its output shaft connected to the rewind roll, a second shaft for the differential connected to the output side of the slip clutch and to the input of the variable speed device, and a third shaft for the differential operable upon a variation in the clutch slippage to effect corrective adjustment in the setting of the variable speed device to restore the clutch slippage to its initial setting.

4. Rewind mechanism comprising in combination a rewind roll, a drive shaft, a variable speed device having an output shaft connected to the rewind roll, a slip clutch, said drive shaft being connected to the input side of said clutch, a differential having a shaft connected to said drive shaft, a second shaft for said differential, a drive connection between the output side of the slip clutch, said second shaft of the differential and the input shaft of the variable speed device, a third shaft for the differential connected to the adjusting shaft of the variable speed device for automatically adjusting the variable speed device to maintain a constant slippage at the slip clutch to compensate for the increasing diameter of the rewind roll, and an electric motor connected to the input shaft of the variable speed device, operative to restore the variable speed device to its initial setting through the mechanism of said differential for minimum diameter of rewind roll.

5. Rewind mechanism comprising in combination a rewind roll, a drive shaft, a variable speed device having an output shaft connected to the rewind roll, a slip clutch, said drive shaft being connected to the input side of said clutch, a differential having a shaft connected to the drive shaft a second shaft for the differential, a driving connection between the output side of the slip clutch, said second shaft of the differential and the input shaft of the variable speed device, a third shaft for the differential connected to the adjusting shaft of the variable speed device for automatically adjusting the variable speed device to maintain a constant slippage at the slip clutch to compensate for the increasing diameter of the rewind roll, and an electric motor connected to the input shaft of the variable speed device operative to drive the differential to effect actuation of the adjusting mechanism of the variable speed device to restore the latter to its initial setting for minimum diameter of rewind roll.

6. Rewind mechanism comprising in combination a rewind roll, a variable speed device having an output shaft connected to said roll, a slip clutch, a drive shaft connected to the input side of said clutch, a differential having a shaft connected to said drive shaft, a second shaft for the differential, a drive connection between the output side of the slip clutch, said second shaft of the differential and the input shaft of the variable speed device, and a third shaft for the differential connected to the adjusting shaft of the variable speed device to vary the setting of the variable speed device to maintain the clutch slippage constant, to maintain a constant tension on the material being rewound.

7. Rewind mechanism comprising in combination a rewind roll, a drive shaft, an over-running clutch, a slip clutch, a driving connection from the drive shaft to the output side of the over-running clutch and to the input side of the slip clutch, a correcting differential, a shaft therefor driven from the input side of the over-running clutch, a variable speed device having its output shaft connected to said rewind roll, a driving connection, including a drive for another shaft of the differential, between the output side of the slip clutch and the input shaft of the variable speed device, an adjusting shaft for the variable speed device, and a driving connection between the adjusting shaft and the third shaft of the differential, whereby the slippage of the slip clutch is maintained constant with an increase in the output torque of the variable speed device as the diameter of the rewind roll increases to maintain a substantially constant tension on the material being rewound.

RUDOLPH P. BECHLE.

REFERENCES CITED

The following references are of record in the file of this patent:

UNITED STATES PATENTS

| Number | Name | Date |
| --- | --- | --- |
| 1,678,472 | Johnson | July 24, 1928 |
| 2,346,903 | Caffrey | Apr. 18, 1944 |

FOREIGN PATENTS

| Number | Country | Date |
| --- | --- | --- |
| 704,164 | Germany | Mar. 25, 1941 |